Jan. 9, 1962  A. C. HOWARD  3,015,966

VARIABLE DRIVE TRANSMISSION

Filed Sept. 10, 1958

United States Patent Office 3,015,966
Patented Jan. 9, 1962

3,015,966
VARIABLE DRIVE TRANSMISSION
Arthur Clifford Howard, West Horndon, England, assignor to Rotary Hoes Limited, West Horndon, Essex, England
Filed Sept. 10, 1958, Ser. No. 760,155
Claims priority, application Great Britain Sept. 20, 1957
2 Claims. (Cl. 74—325)

The invention relates to a variable drive transmission which, while it is applicable to many uses, is particularly adapted for use with the driving of a transverse rotor shaft of a rotary cultivating machine from a longitudinal shaft. The object of the invention is to enable the drive ratio to be altered in a very simple and convenient manner.

According to the invention a variable drive transmission between two shafts at right angles to each other comprises a lay shaft parallel to one of the two shafts, gearing drivingly connecting the lay shaft to the other of the two shafts and an interchangeable driving connection between adjacent ends of the said one shaft and the lay shaft.

Where the transmission is applied to a rotary cultivating machine, the said other shaft is constituted by a transverse rotor-driving shaft and the said one shaft is constituted by a longitudinal shaft arranged to be driven by an engine-driven shaft, in the case of a self-propelled machine, or by a power take-off shaft of the tractor.

Preferably the interchangeable driving connection is positioned adjacent an opening in a casing in which the interchangeable driving connection and the gearing between the lay shaft and the said other shaft are housed and in which the shafts are journalled, the opening being closable by a detachable cover.

Conveniently the interchangeable driving connection comprises interchangeable reduction gearing. This may include an unequal gear wheel pair, each gear wheel having a splined bore engageable with splined ends of the said one shaft and the lay shaft.

Figure 2:
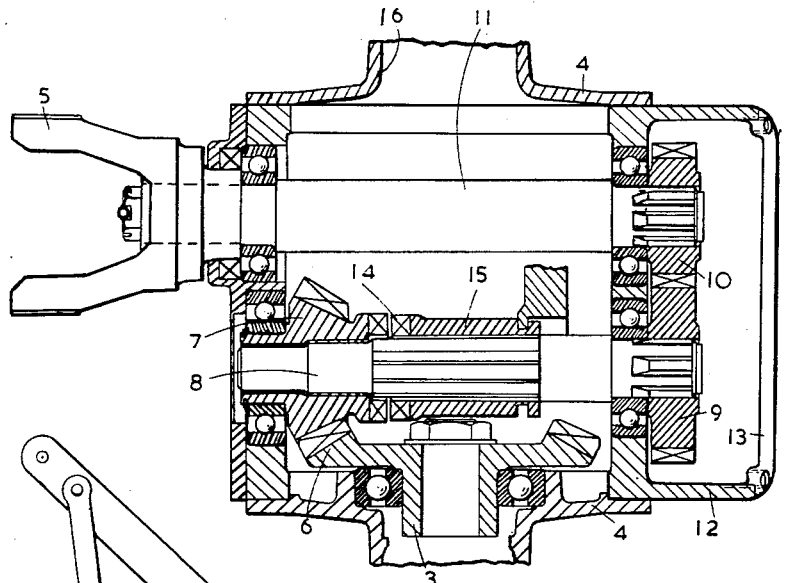
Figure 1:
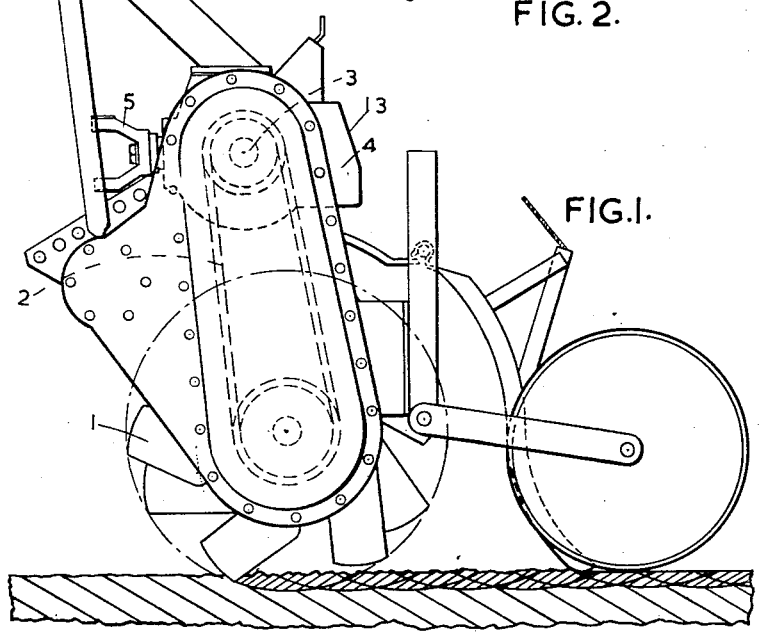

By way of example one embodiment of the invention will now be described with reference to the drawings in which:

FIGURE 1 is a diagrammatic side view of a rotary cultivating machine having a variable drive transmission; and FIGURE 2 is a sectional plan view of the vertical drive transmission shown in FIGURE 1.

From FIGURE 1 it will be seen that the rotary cultivating machine includes a rotor 1 driven by a chain 2 from a rotor-driving shaft 3. The shaft 3 is driven through a variable drive transmission enclosed in a casing 4, from a power take-off shaft of the tractor (not shown) to which a coupling 5 is attached. In FIGURE 2, the rotor driving shaft 3 is shown journalled in the casing 4 and driven by means of bevel gears 6 and 7 by a lay shaft 8 gear through interchangeable pick-off gears 9, 10 from a longitudinal shaft 11 to which the coupling 5 is attached. The lay shaft and longitudinal shaft are appropriately journalled by bearings in the casing 4. The casing 4 has a portion 12 extending around the gears 9 and 10 and is provided with an opening 13 to which a cover is bolted. The bevel gear 7 runs freely on the shaft 8; but can be engaged by means of a dog clutch 14 with the sleeve 15 which is splined to the lay shaft 8. The sleeve 15 may be slid on the splines by an operating lever (not shown) extending from an opening 16 in the casing 4. As has been stated, the gears 9 and 10 are interchangeable and should it be desired to change the drive ratio the cover is removed from the opening 13 and the gears 9 and 10 are exchanged for another gear pair or their positions can be interengaged. The gears 9 and 10 are secured on the ends of the shafts 8 and 11 by any readily detachable means. Spare gears may be housed adjacent the gears 9 and 10 underneath the cover.

What I claim as my invention and desire to secure by Letters Patent of the United States is:

1. A transmission having a casing, a driving shaft in said casing, said casing including spaced-apart front and rear walls transverse with respect to said driving shaft, a lay shaft substantially parallel to said driving shaft, said driving shaft and lay shaft adjacent opposite ends of the casing being journaled in said walls, a third shaft, said third shaft being journaled in said casing intermediate said walls on an axis at a right angle to said lay shaft, intermeshing gearing within the casing between said lay and third shaft including a gear loose on said lay shaft, clutch means rotatable with and slidable along said lay shaft, means operable through said casing from its exterior to shift said clutch means, said driving and lay shafts having portions extending rearwardly beyond said rear wall, and intermeshed reduction gears mounted on said portions of said driving and lay shafts to rotate therewith.

2. A transmission according to claim 1 wherein said intermeshed reduction gears are interchangeable, a wall portion projects rearwardly from said rear wall under and beyond said interengageable gears and upwardly at its ends and rear leaving space for removal and manipulation of said interchangeable gears, and said portions and said interchangeable gears including gears having interengaged splines.

References Cited in the file of this patent

UNITED STATES PATENTS

| | | |
|---|---|---|
| 934,117 | Welton | Sept. 14, 1909 |
| 1,167,887 | Clarke | Jan. 11, 1916 |
| 1,297,462 | Hallenbeck | Mar. 18, 1919 |
| 1,878,442 | Hamshaw | Sept. 20, 1932 |
| 2,301,133 | McElhinney et al. | Nov. 3, 1942 |
| 2,375,184 | Bernhard | May 8, 1945 |
| 2,612,786 | Schmitter | Oct. 7, 1952 |
| 2,670,668 | Konig | Mar. 2, 1954 |

FOREIGN PATENTS

| 528,807 | Great Britain | Nov. 7, 1940 |